July 2, 1957  C. L. CRADDOCK  2,798,171
DIRECT CURRENT PULSER DEVICE
Filed April 5, 1955
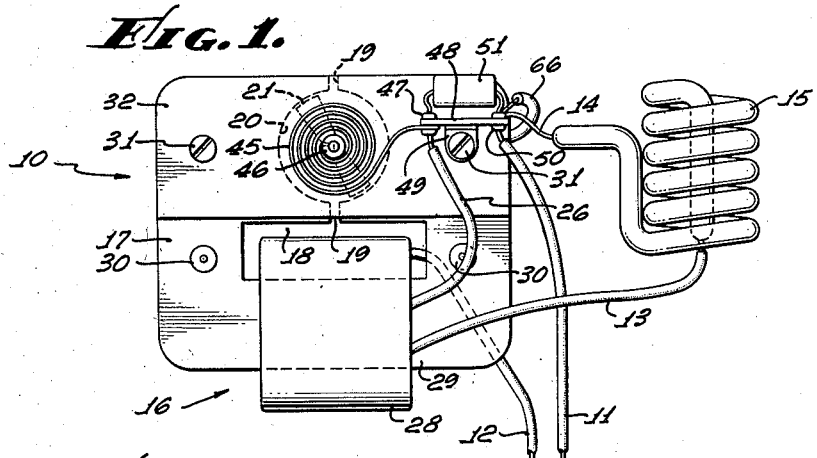
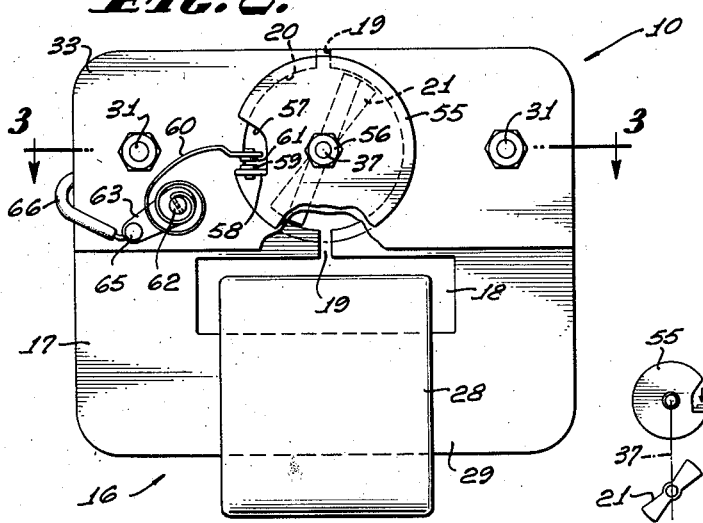
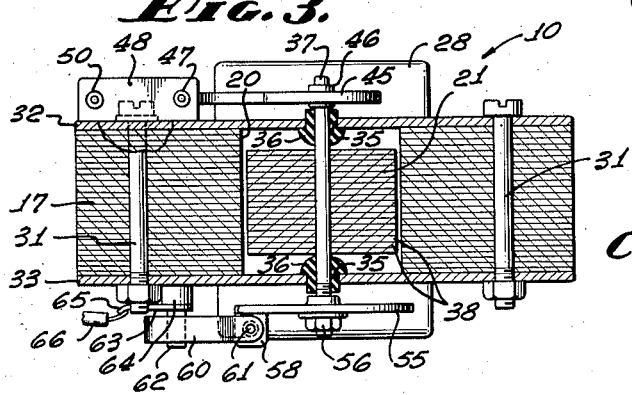
CHARLES L. CRADDOCK
INVENTOR.
BY
ATTORNEY.

United States Patent Office 2,798,171
Patented July 2, 1957

2,798,171
DIRECT CURRENT PULSER DEVICE

Charles L. Craddock, North Hollywood, Calif., assignor to Maxwell Rubin and Les Scherer, Los Angeles, Calif.

Application August 5, 1955, Serial No. 526,623

2 Claims. (Cl. 307—132)

This invention relates to mechanisms for causing an automatic recurrent flashing of an electrical lamp and particularly to a direct current pulser device for intermittently energizing a gaseous light emitter with a high voltage transformer built integral with said device.

It is a particular object of the present invention to provide such a pulser device which will be adequately energized over long periods of time to perform its function above stated by a low voltage dry battery.

It is another object to provide such a pulser device which may be inexpensively produced; which will have a long operating life and require relatively little attention for maintenance.

A further object of the invention is to provide such a pulser device, the period between flashes of which is readily adjustable and having a switch closing contact which is invested at the initiation of each operating cycle with a substantial torque impulse which positively opens the switch thereby giving assurance that said contact will not in any event be allowed to come to rest with the switch closed and shorting the battery.

The manner of accomplishing the foregoing objects as well as further objects and advantages will be made manifest in the following description taken in connection wth the accompanying drawings, in which Fig. 1 is a front view of a preferred embodiment of the pulser device of the invention with the latter connected to a gaseous light emitter for intermittently energizing the latter.

Figure 2 is an enlarged view of the pulser device shown in Fig. 1 from the opposite side thereof with portions thereof broken away to show the magnetic gap provided in opposite directions from the axis of the switch opening armature.

Fig. 3 is a horizontal sectional view taken on the line 3—3 of Fig. 2 showing the manner in which the switch opening armature is mounted on the armature shaft within a cylindrical recess provided in opposite juxtaposed ends of the laminated field core.

Fig. 4 is an electric diagram illustrating the wiring of the pulser device shown in Figs. 1, 2 and 3.

Referring specifically to the drawings, the invention is there shown as embodied in a direct current pulser 10 having positive and negative battery leads 11 and 12 which connect respectively with the positive and negative terminals of a dry battery (not shown) and secondary leads 13 and 14 which connect the pulser 10 to a gaseous light emitter 15 which is preferably a neon tube.

The pulser 10 includes a transformer 16 embodying a U-shaped substantially rectangular laminated soft iron core 17 which practically surrounds an internal space 18 (Figs. 1 and 2) with the ends of said core being juxtaposed across a magnetic gap 19 and having formed therein a cylindrical chamber 20 for accommodating an oscillatory laminated soft iron armature 21.

The transformer 16 has a primary winding 25, one end of which connects with the lead 12 and the other end of which connects with a conductor 26. This transformer also has a secondary winding 27, one end of which connects with the conductor 26 and the other end of which is connected by the conductor 13 with the neon tube 15. The windings 25 and 26 are embodied in a coil 28 which is wound about a base portion 29 of the laminated transformer core 17 and extends through the central space 18 of said core.

The laminations of the core 17 may be held together by rivets 30 or other fastening means and they are also held together by bolts 31. These bolts also secure two non-magnetic bearing mounting plates 32 and 33 closely pressed against opposite faces of said core and permanently assemble said plates on said core. The plates 32 and 33 are provided with aligned holes 35 which are concentric with the armature chamber 20, the holes 35 receiving nylon bearings 36 in which an armature shaft 37 journals.

The armature 21 is fixed on the shaft 37 between the bearings 36 and is adapted to oscillate in the cylindrical chamber 20 disposed between the juxtaposed ends of the transformer core 17. The armature 21 is made up of a plurality of relatively long narrow soft iron laminations 38 which are perforated centrally to receive the shaft 37, these laminations being in slightly twisted relation to each other giving the armature a helical shape as indicated in Fig. 2.

Mounted on the end of shaft 37 which extends outwardly beyond the plate 32 is a spiral return spring 45, one end of which is secured to a hub 46 mounted on said shaft and the other end of which is secured by a rivet 47 to a dielectric shelf 48 mounted on a bracket 49 which is rigidly secured to the plate 32 by one of the bolts 31. The shelf 48 also has a rivet 50, these rivets forming electric terminals for a condenser 51 shunted thereacross. The conductor 26 connects to the terminal 47. The leads 11 and 14 connect to the terminal 50.

Mounted on the opposite end of the shaft 37 where this extends outwardly beyond the non-magnetic plate 33 is a contact disc 55 which is threaded on said shaft and held thereon in rotatably adjustable position by a nut 56. The disc 55 has a notch 57 cut from the periphery thereof and a portion of the material outstruck to form said notch is bent outwardly from said disc to provide a contact lug 58 for a contact 59. Supported in juxtaposed relation with the contact 59 by a flat spiral spring 60 is an approximately stationary contact 61. The contact 61 is mounted on one end of said spring and the opposite end of the latter is embedded in a metallic pin 62 which extends outwardly from an adjustment arm 63 which is rotatably mounted about the axis of the pin 62 on an insulation block 64 which is mounted in turn on the plate 33 and insulates the pin 62 and arm 63 from the plate 33.

The arm 63 has a terminal 65 which is connected by a conductor 66 to terminal 50.

When used commercially the current pulser 10 is mounted in a housing (not shown) and the neon tube 15 is mounted in a portion of this housing with a transparent window through which light is emitted from the tube 15. The housing also encloses a dry battery with which the leads 11 and 12 connect. A manually operable switch as indicated at 70 is provided in the lead 12 which is closed to start the operation of the pulser 10 and opened to discontinue its operation.

When switch 70 is closed, current travels from the positive lead 11 through terminal 50, conductor 66, arm 63, post 62, spring 60, contact 61, contact 59, disc 55, shaft 37, hub 46, spring 45, terminal 47, conductor 26, primary winding 25, and through switch 70 and terminal 12 back to the battery. This flow of current energizes the magnet 16, which also constitutes a transformer, thereby creating a magnetic field in the space occupied by the armature 21 and exciting the secondary winding 27 to energize the neon tube 15 with a current of high potential thereby causing it to be illuminated. The magnetic field thus produced applies rotational forces to the armature 21 thereby imparting to this armature a substantial torque which rotates the armature, the shaft 37 and the disc 55 to withdraw contact 59 from engagement with the contact 61 thus breaking the circuit of the pulser 10. The spring 60 holds the contact 61 against the contact 59 with a yieldable pressure so that the contact 61 follows the contact 59 a short distance before engagement between these contacts is broken. This causes the magnetic field operating on the armature 21 to endure for a sufficient period of time to give a very positive rotational acceleration to this armature which assures a positive disengagement of the contacts 59 and 61. The momentum of rotation of the armature 21 and elements assembled therewith causes the contacts 59 and 61 to be separated a substantial distance before this momentum is overcome by the spiral spring 45 and the tension built up in this spring operates to reverse the rotation of the shaft 37 and return contact 59 into engagement with the contact 61.

With the re-engagement of these contacts the neon tube 15 is again illuminated and the cycle of operation of the pulser 10 above described continues to be thus repeated causing a succession of uniformly timed flashes of light to be emitted by the tube 15.

From the above description it is believed the simplicity of design, economy of manufacture, and relative freedom from maintenance charges of the pulser 10 will be readily apparent. The various mechanical elements of the pulser are assembled entirely on the two identical plates 32 and 33 and these plates are assembled on the magnet core 17 by bolts 31 which also perform the function of uniting the laminations of said core.

The use of gaps 19 between juxtaposed ends of the core 17 facilitates the efficient concentration of the magnetic flux developed by the magnet 16 in rotating the armature 21 and the impartation of relatively high torque forces through said armature to the shaft 37 and disc 55 causing a positive opening of the engagement between the contacts 59 and 61 and thereby assuring that this engagement will never be permanently maintained while the switch 70 is closed and the battery connected with the pulser 10 has sufficient energy to operate the pulser.

The coil spring 60 aids in thus assuring the breaking of the engagement between contacts 59 and 61, immediately following their engagement, by this spring causing the contact 61 to follow the contact 59 a short distance before the break occurs, thus building up in the armature 21 a relatively high torque which makes the break positive when it occurs.

By reference to Fig. 4, it will be noted that the shaft 37, armature 21, spring 45, contact disc 55 and contacts 59 and 61 comprise a breaker unit for which the contact 61 and the outer end of spring 45 constitute electrical end terminals. It is also to be noted in the wiring diagram of Fig. 4, that one of the battery leads, 12, connects with one end of primary transformer winding 25; that the other battery lead, 11, connects with one of the breaker unit terminals (contact 61, through spring 60); that a conductor 26 connects the other of said breaker unit terminals (outer end of spring 45) with the other end of primary winding 25 and with one end of secondary winding 27; and that a circuit means is provided, including conductor 13, neon tube 15, conductor 14, conductor 66, arm 63, spring 60, the breaker unit aforesaid, and conductor 26, which circuit means connects to opposite ends of secondary winding 27 for energizing neon flasher tube 15 incidental to the intermittent engagement of said breaker contacts 59 and 61.

While only a single embodiment of the invention is disclosed herein it is to be understood that numerous modifications may be made in this without departing from the spirit of the invention or the scope of the appended claims.

I claim:

1. In a direct current pulser adapted to be operated by a dry battery, the combination of: a transformer having a laminated core in the shape of a rectangle one of the sides of said rectangular core having a narrow flux gap which is internally enlarged to form a cylindrical armature chamber, and primary and secondary windings wound about the other side of said core; non-magnetic metal plates bolted to opposite faces of said core; aligned dielectric bearings provided in holes in said plates formed coaxially with said chamber; a metal shaft journaling in said bearings; an iron armature fixed on said shaft and free to oscillate within said chamber; a spiral spring having central and outer ends, said central end being fixed to one end of said shaft; dielectric means providing an insulated mounting for the outer end of said spring on the adjacent one of said plates; a swinging first electric contact mounted on the other end portion of said shaft to follow a certain arc when said armature oscillates in said chamber; a relatively stationary second electric contact; dielectric means providing an insulated yieldable mounting on the other of said plates for said second electric contact; battery leads connecting to one terminal of said primary winding and to said second electric contact through its yieldable mounting; a conductor connecting said outer end of said spring to the other terminal of said primary winding and to one terminal of said secondary winding; and leads from the other end of said secondary winding and from said second electric contact which are adapted for energizing a neon flasher light bulb.

2. In a direct current pulser adapted to be operated by a dry battery, the combination of: a transformer having a laminated core in the shape of a rectangle, one of the sides of said rectangular core having a narrow flux gap which is internally enlarged to form a cylindrical armature chamber, and primary and secondary windings wound about the other side of said core; metal bearing support plates bolted to opposite faces of said core, said plates having a substantially non-magnetic relation with said core; dielectric bearing means provided in holes in said plates formed coaxially with said chamber; a metal shaft journalling in said bearing means; an iron armature fixed on said shaft and free to oscillate within said chamber; a spiral spring having central and outer ends, said central end being fixed on said shaft; means providing a mounting for the outer end of said spring on an adjacent one of said plates; a swinging first electric breaker contact mounted on said shaft to follow a certain arc when said armature oscillates in said chamber; a relatively stationary second electric breaker contact disposed within said arc to be engaged by said first breaker contact; means for mounting said second breaker contact on an adjacent one of said plates; yieldable means associated with one of said breaker contacts causing said contact to yield during the initial portion of an engagement between said contacts and then react to deliver a reverse rotary impulse to said shaft, said outer end of said spring and said second breaker contact comprising terminals of a breaker unit including said shaft, said armature, said spring and said breaker contacts; battery leads connecting to one end of said primary winding and to one of said breaker unit terminals; a conductor connecting the other of said breaker unit terminals with the other end of said primary winding and with one end of said secondary winding; and circuit means connected to opposite ends of said secondary winding for energizing a neon flasher tube incidental to the intermittent engagement of said breaker contacts.

References Cited in the file of this patent

UNITED STATES PATENTS

| 1,301,949 | Kendall | Apr. 29, 1919 |
| 1,767,104 | Volkman | June 24, 1930 |

FOREIGN PATENTS

| 869,441 | France | Nov. 7, 1941 |